United States Patent [19]

Tumey et al.

[11] 4,209,288
[45] Jun. 24, 1980

[54] FROZEN CONFECTION PRODUCING SYSTEM

[75] Inventors: Lawrence F. Tumey, Lakeland, Fla.; Paul Zuker, West New York, N.J.

[73] Assignee: FMC Corporation, San Jose, Calif.

[21] Appl. No.: 918,521

[22] Filed: Jun. 23, 1978
(Under 37 CFR 1.47)

[51] Int. Cl.² .......................... A23G 9/26; A23G 9/18
[52] U.S. Cl. .................................. 425/113; 425/114; 425/126 S; 425/DIG. 219; 426/524; 426/565
[58] Field of Search ................ 425/126 S, 117, 162, 425/113, 114, DIG. 219; 426/565, 524

[56] References Cited

U.S. PATENT DOCUMENTS

| | | | |
|---|---|---|---|
| 1,960,456 | 5/1934 | Robb | 425/126 S X |
| 2,625,120 | 1/1953 | Eddy et al. | 425/126 S X |
| 2,700,347 | 1/1955 | Gram et al. | 425/126 S |
| 2,884,875 | 5/1959 | Rasmusson | 425/162 X |
| 2,892,423 | 6/1959 | Glass | 425/126 S X |
| 2,925,052 | 2/1960 | Glass | 425/126 S X |
| 2,953,105 | 9/1960 | Rasmusson | 425/126 S X |
| 3,407,755 | 10/1968 | Rasmusson | 425/126 S |
| 3,468,267 | 9/1969 | Otken | 425/117 X |
| 3,554,138 | 1/1971 | Glass | 425/126 S |
| 3,632,245 | 1/1972 | Getman | 425/126 S X |
| 3,648,625 | 3/1972 | Glass | 425/126 S X |
| 3,730,661 | 5/1973 | Tremblay | 425/126 S |
| 3,857,252 | 12/1974 | Wight | 425/126 S X |
| 3,859,019 | 1/1975 | Wight | 425/126 S |

FOREIGN PATENT DOCUMENTS

| | | | |
|---|---|---|---|
| 245195 | 1/1963 | Australia | 425/117 |
| 519344 | 12/1955 | Canada | 425/117 |
| 724549 | 2/1955 | United Kingdom | 425/126 S |

*Primary Examiner*—Philip Anderson
*Attorney, Agent, or Firm*—R. S. Kelly; H. M. Stanley; F. W. Anderson

[57] ABSTRACT

A conventional refrigeration vault has cooling coils and air-moving fans for freezing confections that are conveyed therethrough. An endless conveyor belt describes a tortuous path through the vault and carries the confections in a spaced single-file arrangement. One wall of the refrigeration vault has openings therein, and one reach of the endless conveyor belt extends through the openings to pass by a discharge point, at which finished (hard frozen) confections are removed, as well as a pickup point at which soft frozen confections having a predetermined shape are received. The soft frozen confections are introduced through one of the openings into the refrigeration vault and travel along the tortuous path for a relatively short distance (as compared with the total length of the conveyor within the vault). The confections then emerge from the vault through a wall opening on a stick insertion conveyor reach at which time they have a frozen outer shell obtained during the time required to travel the relatively short distance through the refrigeration vault. A conventional stick inserter is positioned adjacent the stick insertion conveyor reach and operates to sequentially insert sticks into each of the confections through the frozen shells thereof. Distortion of the predetermined shape of each confection is resisted by the rigidity of the frozen shell as the stick is inserted, and the stick is supported in place within the still soft inner part of the confection. The confection with the stick inserted into the body thereof is reintroduced, through a wall opening, into the refrigeration vault where it transits the remainder of the tortuous conveyor path emerging once again on the conveyor reach which directs it to the discharge point as a completely frozen confection of predetermined shape containing a stick insert.

2 Claims, 4 Drawing Figures

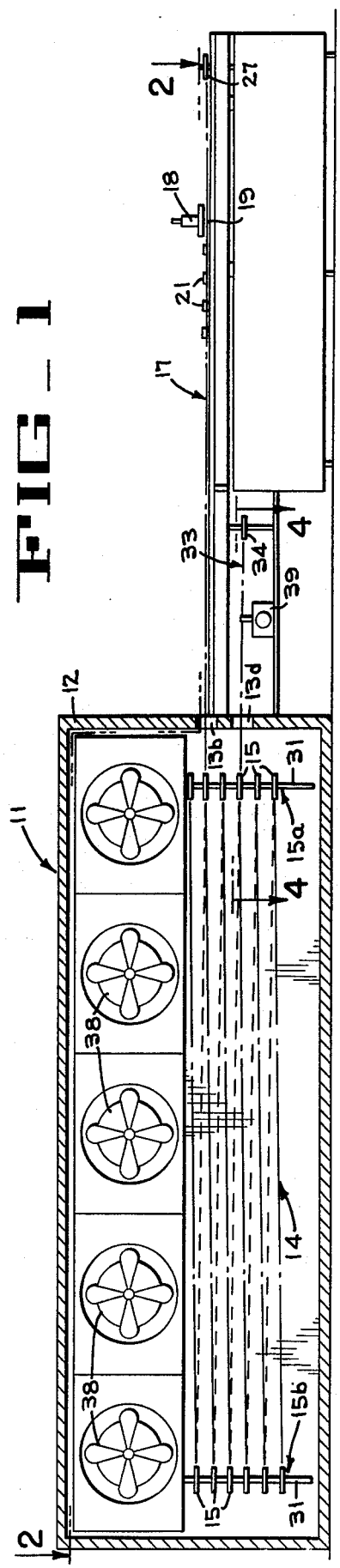
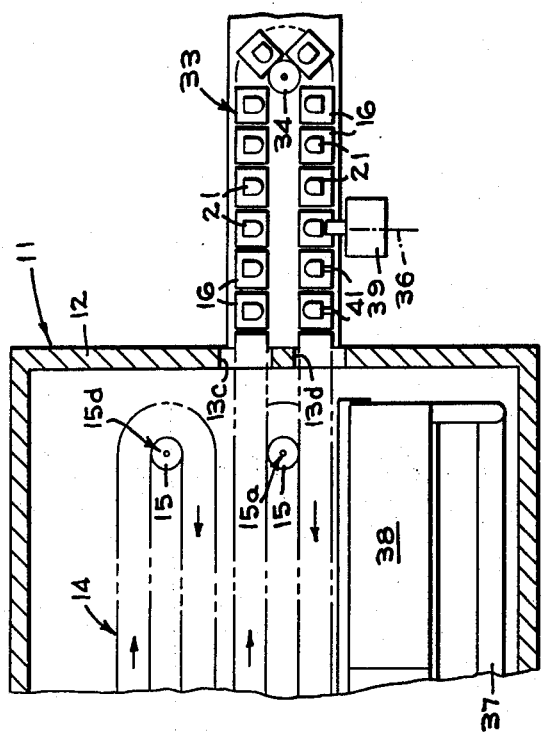

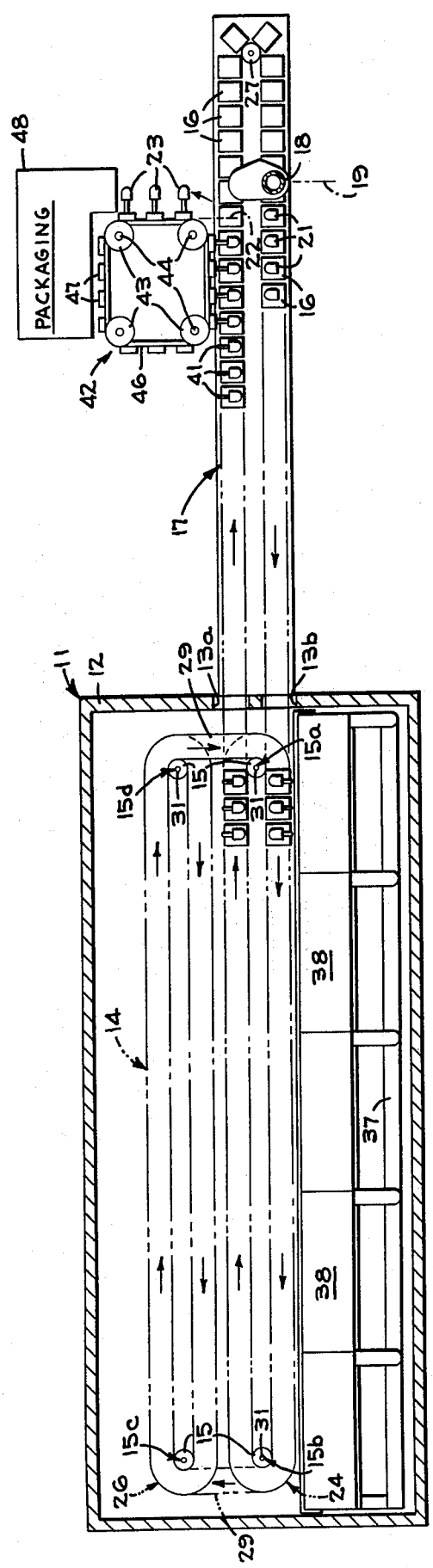
FIG_2

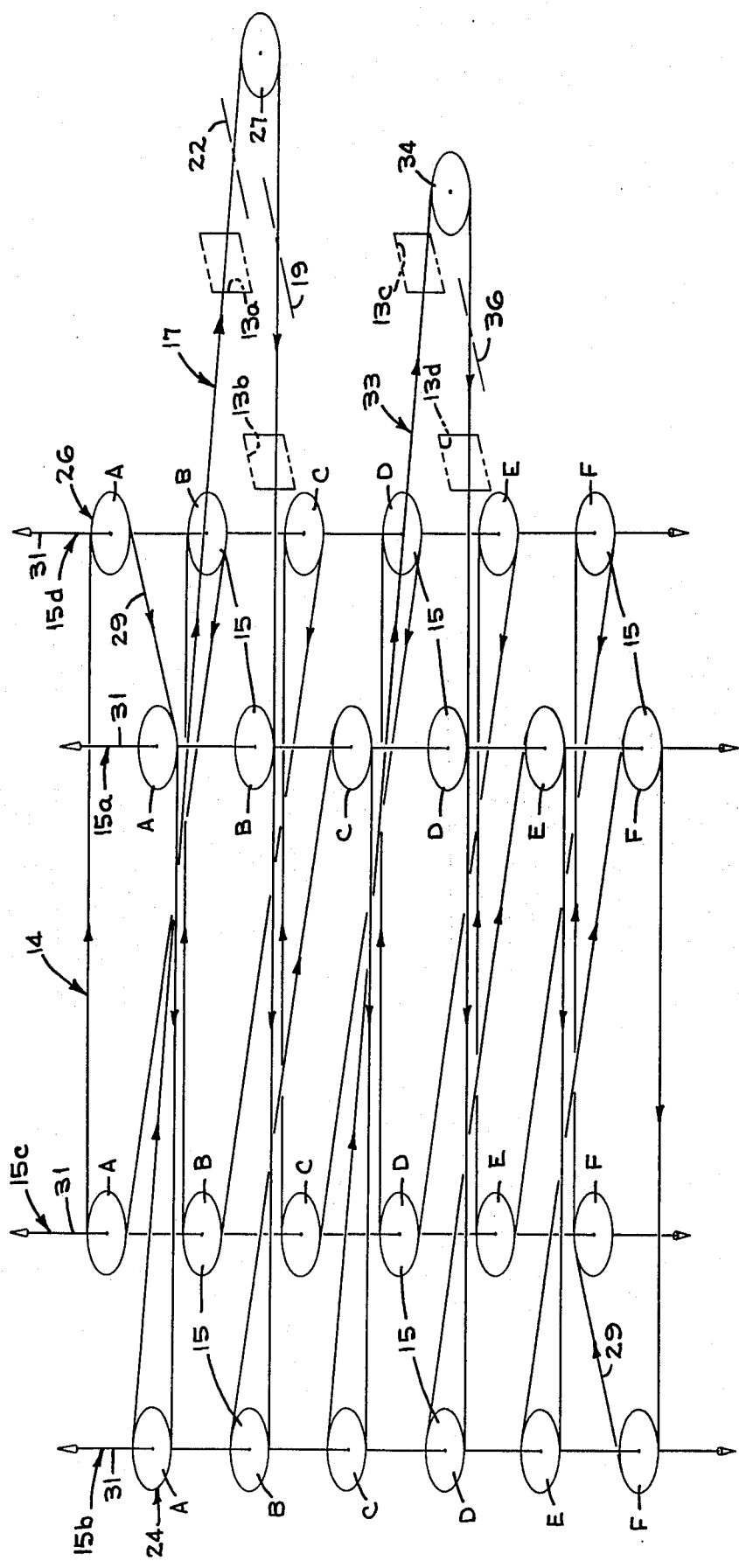

FROZEN CONFECTION PRODUCING SYSTEM

BACKGROUND OF THE INVENTION

1. Field of the Invention

This invention relates to a system for freezing food products, and more particularly, to a system for preparing frozen confections, such as ice cream, on a stick.

2. Description of the Prior Art

Food product freezing systems using refrigeration vaults containing endless conveyor belts are well known in the art and are typified by the structures shown in U.S. Pat. Nos. 2,925,052 issued to Glass and 3,857,252 issued to Wight. The Glass patent discloses a refrigeration vault which contains an endless conveyor that carries a number of frozen confection molds through the refrigeration vault. The molds are configured to support sticks in the confections during freezing. When the confections are completely frozen the molds are heated to release the frozen confection therefrom and the confection may thereafter be coated and packaged having the shape imparted thereto by the mold.

The aforementioned patent to Wight U.S. Pat. No. 3,857,252 also discloses an endless conveyor belt which carries frozen confections in single file on a tortuous path through a freezing vault. The Wight conveyor belt is made up of a series of individual plates attached to a continuous chain. The plates are configured to receive portions of a confection each of which is extruded, cut off, and allowed to drop on one of the plates. The extruded confection portion is soft frozen, assuming a plastic-like state, and a stick is inserted into each confection portion in the soft frozen state immediately after it is extruded. The conveyor plates containing the confection portions with the inserted sticks are introduced into the refrigeration vault through an opening in the vault wall. The part of the frozen confection which is displaced in each confection portion by the stick during its insertion produces internal forces that are directed outwardly to distort the external shape of the portion compared to its shape as originally extruded. While the special mold holding structure required by the Glass conveying arrangement is not required by Wight, the confection product produced by the Wight freezing apparatus retains the distortion imposed by the stick insertion process, and such distortion causes problems during packaging of the finished frozen articles.

A desirable system for producing frozen food articles is one which does not require a mold to carry the articles during the freezing process and yet which maintains the external shape of the frozen food article throughout the stick insertion and freezing steps of the process.

SUMMARY OF THE INVENTION

In general, the system of the present invention for preparing frozen food products provides a product having a predetermined external shape and a stick insert protruding therefrom. The system includes a refrigeration vault and an endless conveyor having its major length within the refrigeration vault but being configured with conveyor reaches extending outside the vault to receive and discharge the individual food products. The endless conveyor also includes a stick insert conveyor reach which extends outwardly from the refrigeration vault and which is located on the conveyor path so that the food products are conveyed within the vault both before and after such conveyor reach. The conveyor path is such that a food product received on the conveyor transits through the refrigeration vault for a period sufficient to freeze a shell on the food product prior to arriving at the stick insert conveyor reach. Means is provided adjacent to the stick insert conveyor reach outside of the vault for inserting a stick into each food product as it passes. The frozen shell resists distortion of the predetermined external shape of the food product during the stick insertion process while the soft frozen center of the food product supports the stick insert until the entire food product is solidly frozen by exposure, while on the conveyor within the refrigeration vault, to the remainder of the freezing process.

The method of preparing a frozen confection with a predetermined external shape and a stick protruding therefrom utilizing the apparatus of the invention includes the steps of shaping a plastic phase portion of the confection and freezing a shell on the shaped portion. The stick is inserted into the shaped portion with the frozen shell so that distortion of the predetermined shape is resisted as the stick is inserted, and the stick is supported in place by the body of the partially frozen confection. Subsequent freezing of the entire shaped portion of the confection to the hardness of the shell provides a completely frozen confection which is ready for packaging.

It is an object of the present invention to provide a system for preparing a frozen food product with a stick insert which has a closely controlled external configuration.

Another object of the present invention is to provide a system for preparing a frozen food product having a stick insert which avoids the use of a special mold structure to retain the product while it is being frozen.

Another object of the present invention is to provide a system for freezing a food product having a shape which will be maintained throughout the freezing process even though a stick is inserted into the product during such freezing process.

Additional objects and features of the invention will appear from the following description in which the preferred embodiment has been set forth in detail in conjunction with the accompanying drawings.

BRIEF DESCRIPTION OF THE DRAWINGS

FIG. 1 is a diagrammatic side elevation view (with a portion of the freezing vault wall being removed) of the frozen food product preparation system of the present invention.

FIG. 2 is a section taken along the line 2—2 of FIG. 1.

FIG. 3 is a diagrammatic view of the conveyor stranding of the food product conveyor shown in FIGS. 1 and 2.

FIG. 4 is an enlarged partial section taken along the line 4—4 of FIG. 1.

DESCRIPTION OF THE PREFERRED EMBODIMENT

FIG. 1 shows a refrigeration vault 11 having heat insulating walls. One end wall 12 of refrigeration vault 11 has openings 13a–13d (FIGS. 1, 2 and 4) therein. An endless conveyor 14 is shown disposed within refrigeration vault 11 describing a tortuous path through vault 11 around a plurality of sprocket stacks 15. Endless conveyor 14 includes an endless chain (not shown)

which has a plurality of plates 16 attached thereto in side-by-side relation as shown in FIGS. 2 and 4. A conveyor including an endless chain with attached plates of the type 14 used in the present invention is described in U.S. Pat. No. 3,857,252 to Wight discussed hereinbefore, and references to such prior patent may be had for a more complete description of the conveyor.

An upper conveyor reach 17 (FIGS. 1 and 2) on conveyor 14 extends from refrigeration vault 11 through opening 13a, as seen in FIG. 2, and re-enters refrigeration vault 11 through adjacent opening 13b. Upper conveyor reach 17 passes beneath an extruder 18, which extrudes partialy frozen (soft frozen) ice cream mix or other confection mix. Portions of the confection mix are sequentially severed from the extrusion in a known fashion synchronously with the movement of the plates 16 and are sequentially dropped onto separate ones of the plates 16. Extruder 18 is located at an initial position 19 on upper conveyor reach 17. As seen in FIG. 2, extruder 18 deposits a series of portions 21 of the confection mix having a predetermined shape onto successive ones of the plurality of plates 16 as they are moved past initial position 19 on endless conveyor 14. Plates 16 are of generally flat configuration to support the shaped portions 21 and are cooled in refrigeration vault 11 prior to reaching initial position 19. Thus, when the shaped portions 21 are dropped into the plates 16 they adhere thereto as the surface layers of the shaped portions 21 freeze on contact with the plates 16.

Also located on upper conveyor reach 17 is a discharge station 22, as seen in FIG. 2, at which finished frozen confection products 23 are diverted from endless conveyor 14 in a manner to be hereinafter described.

A driver pulley 27 for the endless conveyor 14 is shown in FIG. 2 disposed outside of refrigeration vault 11 on conveyor reach 17. Driver pulley 27 is driven by any appropriate device such as an electric motor (not shown) coupled thereto. Endless conveyor 14 described a tortuous path within refrigeration vault 11 extending through two parallel conveyor run stacks 24 and 26 (as seen in FIG. 2) with several conveying levels being provided in each stack (as seen in FIG. 1). In FIGS. 1 and 2 conveyor 14 is seen to pass between four sets, or stacks, of vertically aligned sprockets 15 within the refrigeration vault 11 with two sets of sprockets making up each conveyor run stack. In the preferred embodiment the stacks of sprockets 15 are mounted two each at opposite ends of vault 11 so that a stack of sprockets 15 provides support for each end of each of the conveyor run stacks 24 and 26. Conveyor 14 passes between conveyor run stacks 24 and 26 at two crossover reaches 29 (FIGS. 2 and 3), one at each end of the vault 11. Endless conveyor 14 proceeds between initial position 19 and discharge station 22 in the direction of the arrows shown thereon.

A detailed description of the stranding of conveyor 14 is undertaken with reference to FIG. 3. Since conveyor 14 will flex in one direction only, the conveyor passes around each sprocket 15 in the sprocket stacks in the same rotational direction (i.e., clockwise as viewed from above).

Six sprockets 15 are mounted on a common shaft 31 to provide each of the four stacks of sprockets 15, which are shown in FIG. 3 as sprocket stacks 15a, 15b, 15c and 15d. Sprocket stacks 15a and 15b operate to guide conveyor 14 through conveyor run stack 24, and sprocket stacks 15c and 15d guide the conveyor 14 through conveyor run stack 26. The individual sprockets 15 in each stack 15a–15d are designated by the letters A through F from top to bottom (FIG. 3) for purposes of this description. Upper reach 17 of conveyor 14 is shown being driven by drive pulley 27 to pass initial position 19 to enter the vault 11 through opening 13b in wall 12. Thereafter the conveyor 14 is directed to stick insertion reach 33 (FIG. 4) which extends outside vault 11, in the following manner: from sprocket B in stack 15a to sprocket B in stack 15b, to sprocket C in stack 15a, to sprocket C in stack 15b, to sprocket D in stack 15a, to opening 13c, and to stick insertion reach 33.

Stick insertion reach 33 passes around an idler pulley 34 and returns past a stick insertion position 36 (FIG. 3) where a stick inserter 39 (FIG. 4) is located and reenters the vault 11 through the opening 13d. The remainder (and longer portion) of the tortuous path for the conveyor 14 from opening 13d through the refrigeration vault 11 to discharge station 22 is as follows: from sprocket D of stack 15a to sprocket D of stack 15b, to sprocket E of stack 15a, to sprocket E of stack 15b, to sprocket F of stack 15a, to sprocket F of stack 15b, to bottom crossover reach 29, to sprocket F of stack 15c, to sprocket F of stack 15d, to sprocket E of stack 15c, to sprocket E of stack 15d, to sprocket D of stack 15c, to sprocket D of stack 15d, to sprocket C of stack 15c, to sprocket C of stack 15d, to sprocket B of stack 15c, to sprocket B of stack 15d, to sprocket A of stack 15c, to sprocket A of stack 15d, to top crossover reach 29, to sprocket A of stack 15a, to sprocket A of stack 15b, to sprocket B of stack 15a, to opening 13a, and to discharge station 22.

Refrigeration vault 11 contains standard refrigeration coils 37 and air movement fans 38 (FIG. 3) which are well known in this field. Refrigeration coils 37 and fans 38 produce subfreezing temperatures and transversely circulating air currents within refrigeration vault 11.

Stick insertion coveyor reach 33 is best seen in FIG. 4 extending from opening 13c and carrying shaped confection portions 21 on plates 16. As set forth in conjunction with FIG. 3, stick insertion conveyor reach 33 is guided around the idler 34 and thereafter passes stick insertion position 36. The stick inserter 39 is located at position 36. A stick 41 is inserted into each portion 21 by the stick inserter 39, as can be seen from FIG. 4.

Stick inserter 39 may be of the type generally described in U.S. Pat. No. 3,859,019 to Wight. The stick inserter disclosed in the Wight patent is one which sequentially inserts sticks into each product in a constantly moving line of spaced confection products. A cam operated drive system for the inserter is synchronously connected by mechanical linkage (not shown) to the main conveyor drive. A reciprocating motion is imparted to a carriage in stick inserter 39 so that the carriage can be moved in a direction parallel to the direction of movement of the portion of the stick insertion conveyor reach 33 adjacent the stick inserter 39. The carriage on the stick inserter 39 is initially stationary, is accelerated in the direction of movement of the adjacent portion of the conveyor 14 to reach the velocity of the conveyor, and maintains that velocity while a stick is emitted therefrom to penetrate a shaped confection portion 21 as it passes stick insertion position 36. The carriage is then slowed and repositioned to perform the same operaton on the subsequent confection portion 21 passing stick insertion position 36 on conveyor 14. Obviously, other types of stick inserters may be used if desired.

Returning to FIG. 2, a diverter 42 for the finished (fully frozen) confection products 23 is there shown (diagrammatically) mounted adjacent to the upper conveyor reach 17 at the discharge station 22. The diverter may be of the type described in U.S. Pat. No. 3,648,625 to Glass. A plurality of guide pulleys 43 are mounted on shafts 44 in a common framework (not shown). A diverter conveyor 46 is stranded around guide pulleys 43 to form a conveyor path rectangular in shape. The guide pulleys 43 are driven synchronously with drive pulley 27 for conveyor 14. A plurality of pick-up clamps 47 are attached to diverter conveyor 46 and spaced thereon similarly to the spacing of the plates 16 of conveyor 14 so that the clamps 47 on the side adjacent to conveyor 14 can each be aligned with a particular stick 41 extending from one of the frozen confections 23 carried on the plates 16. Each clamp 47 is adapted to grasp a stick 41 aligned therewith and to carry the finished frozen confection 23 off of conveyor 44 at diverter station 22 to a packaging device 48. Packaging device 48 forms no part of the present invention and may be an automated device or may represent a manual packaging operation if so desired. Packaging efficiency requires that a container holding a predetermined number of finished confection products 23 be completely filled. Thus, a close control of the external size and shape of each finished product 23 is required.

The manner in which the partially frozen shaped portions 21 of the confection are processed in the apparatus disclosed hereinbefore will now be described. A partially frozen confection mix in a plastic phase is extruded from extruder 18, and portions 21 are sequentially severed from the extrusion and allowed to drop onto the passing plates 16. The shaped portions 21 are severed from the extrusion in synchronism with the passing of the plates 16 beneath extruder 18. Each shaped portion 21 is carried away from the initial extruding position 19 on its plate 16 to enter refrigeration vault 11 through opening 13b in the wall thereof. The shaped portions 21 are routed through vault 11 in a tortuous path as described hereinbefore. After traversing a first portion of the path, conveyor 14 exits from vault 11 though opening 13c onto stick insertion conveyor reach 33. The speed of conveyor 14 and the temperature within the refrigeration vault 11 are such that a frozen shell is formed about each shaped portion 21 with the internal mass thereof remaining substantially in the partially frozen state that existed at extruder 18. Each such portion 21 with a frozen shell receives a stick 41 from stick inserter 39 as it passes the stick insertion position 36. The stick 41 will displace some of the internal plastic phase confection in the shaped portion 21, but enough air will be contained within the partially frozen confection mix in the plastic phase so that the rigidity of the exterior frozen shell will cause the air to be compressed within the shaped portion 21 without appreciable change to the external dimensions or shape thereof.

Each confection portion 21 with stick 41 inserted therein is reintroduced into the refrigeration vault 11 through opening 13d in wall 12 to thereafter again transit the tortuous path as described hereinbefore. It is clear from the foregoing description of the tortuous path segments and the diagram of FIG. 3 that confection portions 21 are subjected to the subfreezing temperatures within refrigeration vault 11 for a relatively short time between entering through opening 13b and exiting through opening 13c as compared to the time within the refrigeration vault 11 between entering at opening 13d and exiting at opening 13a. This accounts for the fact that only a shell is frozen on shaped portions 21 as they travel the first portion of the tortuous path while the shaped portions 21 with the sticks 41 inserted therein are completely frozen through by the time they finally exit the vault 11 at discharge station 22.

EXAMPLE

The apparatus disclosed herein is particularly useful in forming frozen ice cream bars having stick inserts. When used in such a fashion extruder 18 deposits preshaped portions 21 of partially or soft frozen ice cream mix in a plastic phase in the temperature range of 23° to 27° F. on individual ones of the plates 16. The internal environment of the refrigeration vault 11 is maintained at a temperature within the range of −38° F. to −40° F. by removing heat energy therefrom through refrigeration coils 37. The low temperature within refrigeration vault 11 is maintained substantially constant throughout as the fans 38 rotate and thereby circulate the air within vault 11. The shaped ice cream portions 21 are exposed to the aforementioned subfreezing temperatures for a period of approximately 1 to 2 minutes as conveyor 14 travels between the entrance opening 13b in wall 12 of vault 11 to the exit opening 13c at stick insertion conveyor reach 33. Exposure of ice cream portions 21 for the aforementioned period of time forms a frozen crust on each of the portions which provides relatively rigid shells therefor. Stick inserter 39 inserts a stick 41 into each of the partially frozen ice cream portions 21, and the external shapes thereof are not altered due to the resistance provided by the rigidity of the frozen shells. With stick 41 inserted therein, each partially frozen ice cream portion 21 is reintroduced into refrigeration vault 11 through the opening 13d in the wall 12 thereof. The partially frozen ice cream portion 21 is thereafter retained within refrigeration vault 11 at the aforementioned subfreezing temperature for a period of time of from five to ten minutes. Thereafter, a fully frozen ice cream bar having a stick insert emerges from the opening 13a on upper conveyor reach 17 and moves to discharge station 22 as a finished ice cream confection 23. The finished ice cream bars 23 are picked off of upper conveyor reach 17 on conveyor 14 at discharge station 22 by the product diverter 42 and are delivered thereby to the packaging device 48.

Although the best mode contemplated for carrying out the present invention has been herein shown and described, it will be apparent that modification and variation may be made without departing from what is regarded to be the subject matter of the invention.

What is claimed is:

1. Apparatus for preparing a frozen food product having a predetermined shape and a stick protruding therefrom, said apparatus comprising a refrigeration vault having an opening in one wall thereof, means for producing freezing temperatures within said vault, an endless conveyor disposed to transit a path within said refrigeration vault and operating to receive the food product at a loading station and transport the food product therethrough to a discharge station, extruder means for sequentially forming bodies of freezable foodstuff of predetermined shapes on said conveyor at said loading station, said bodies being completely frozen in said vault prior to said discharge station to form frozen food products, a stick insert conveyor reach of said endless conveyor extending outwardly of the vault and returning inwardly of the vault through said opening, the portion of said path between said loading station and said conveyor reach being substantially shorter than the remaining portion of said path between the conveyor reach and the discharge station, means for continuously moving said endless conveyor along said path at a predetermined speed such that said conveyor moves along said path from said loading station through said refrigeration vault to said stick insert conveyor reach for a period of time sufficient to form a frozen crust on the surface of each of said bodies of foodstuff prior to arriving at said stick insert conveyor reach when said refrigeration vault is at a predetermined low temperature, and means adjacent said stick insert conveyor reach for sequentially inserting sticks into said bodies through their crusts, whereby distortion of the predetermined shape of the food product during stick insertion is resisted by the frozen crust thereof.

2. Apparatus as in claim 1 wherein said freezable foodstuff is ice cream, said predetermined low temperature and said conveyor speed being such that said period sufficient to freeze a crust on the body of ice cream is in the range of one to two minutes.

* * * * *